(12) United States Patent
Hyder

(10) Patent No.: US 9,775,276 B2
(45) Date of Patent: Oct. 3, 2017

(54) WORKING VEHICLE

(71) Applicant: YANMAR CO., LTD., Osaka-shi, Osaka (JP)

(72) Inventor: Jarrod Hyder, Adairsville, GA (US)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/054,609

(22) Filed: Feb. 26, 2016

(65) Prior Publication Data
US 2017/0245416 A1     Aug. 31, 2017

(51) Int. Cl.
*A01B 59/043*     (2006.01)
*A01B 63/14*     (2006.01)
*A01B 71/06*     (2006.01)

(52) U.S. Cl.
CPC ............ *A01B 59/043* (2013.01); *A01B 63/14* (2013.01); *A01B 71/063* (2013.01)

(58) Field of Classification Search
CPC ... A01B 59/066; A01B 59/068; A01B 53/043; B60D 1/141
USPC .................. 172/439, 448, 443–445
See application file for complete search history.

(56) References Cited

U.S. PATENT DOCUMENTS

| | | | | |
|---|---|---|---|---|
| 3,140,103 A * | 7/1964 | Richardson | ........... | A01B 59/041 172/448 |
| 3,561,788 A * | 2/1971 | Carlson | ..................... | B60D 1/04 172/272 |
| 3,561,789 A * | 2/1971 | Stikeleather | ......... | A01B 59/062 172/272 |
| 3,829,128 A * | 8/1974 | Sutton | ..................... | B60D 1/141 172/272 |
| 4,090,725 A * | 5/1978 | Perin | ..................... | A01B 59/062 172/272 |
| 4,116,283 A * | 9/1978 | Blessent | .............. | A01B 59/062 172/439 |
| 4,232,878 A * | 11/1980 | Moore, Jr. | ........... | A01B 59/043 172/449 |
| 5,029,650 A * | 7/1991 | Smit | ..................... | A01B 59/062 172/272 |
| 5,169,279 A * | 12/1992 | Zimmerman | ........ | A01B 59/062 172/439 |
| 5,697,454 A * | 12/1997 | Wilcox | ................ | A01B 59/068 172/439 |
| 7,690,439 B2 * | 4/2010 | Priepke | ................ | A01B 59/006 172/439 |
| 2004/0216654 A1 | 11/2004 | Fischer | | |

(Continued)

FOREIGN PATENT DOCUMENTS

FR     1476693 A     4/1967
JP     2011050262 A     3/2011

OTHER PUBLICATIONS

Extended European Search Report for corresponding Application No. 17157458.5-1656; dated Jul. 28, 2017.

*Primary Examiner* — Matthew D Troutman
(74) *Attorney, Agent, or Firm* — Cantor Colburn LLP

(57) ABSTRACT

A working vehicle comprises a vehicle body, a quick hitch, a working implement connected to the vehicle body via the quick hitch, and a linkage interposed between the quick hitch and the vehicle body. The linkage is movable to raise and lower the quick hitch so as to locate the quick hitch at an optional height. The quick hitch can be inclined to a certain degree in a pitching direction of the vehicle body at the optional height defined by the linkage.

3 Claims, 10 Drawing Sheets

(56) References Cited

U.S. PATENT DOCUMENTS

2007/0169951 A1* 7/2007 Clement .............. A01B 59/062
 172/439
2009/0084566 A1* 4/2009 Bernhardt ............ A01B 59/066
 172/444

* cited by examiner

WORKING VEHICLE

BACKGROUND OF THE INVENTION

Field of the Invention

The present invention relates to a working vehicle in which a working implement is connected to a vehicle body via a quick hitch.

Related Art

A tractor disclosed by JP 2011-50262 A has a rotary cultivator connected to the vehicle body via a quick hitch provided on a rear portion of the vehicle body. In this regard, the tractor is provided with a three-point linkage at the rear portion of the vehicle body. The three-point linkage includes a top link and a pair of right and left lower links. The lower links are able to rotate upward and downward by activating respective hydraulic lift cylinders. The top link is disposed upward from a lateral central position between the right and left lower links. The quick hitch is attached to the three-point linkage so as to connect a rear end of the top link to rear ends of the right and left lower links.

The quick hitch is provided at a laterally central top portion thereof with a hitch hook, so that a mast bracket projecting upward from a front portion of the rotary cultivator is hitched up and hooked on the hitch hook. The quick hitch is provided at right and left bottom portions thereof with respective lower hooks, which are fitted to engagement pins on right and left ends of a front portion of the rotary cultivator.

Once the mast bracket of the rotary cultivator placed on the ground is hitched up by the hitch hook of the quick hitch lowered by activating the lift cylinders, the rotary cultivator is drawn by its own gravity toward the quick hitch, and the engagement pins of the rotary cultivator are fitted into the lower hooks, thereby completing attachment of the rotary cultivator to the quick hitch.

As mentioned above, a working implement, e.g., a rotary cultivator, to be connected to a vehicle body of a working vehicle, e.g., a tractor, via a quick hitch has an engagement device, e.g., a mast bracket, to be fitted to a hitch hook of the quick hitch. This engagement device has to be located at an appropriate position for its fitting to the hitch hook. Therefore, the working implement may be inclined forward for the location of the engagement device.

However, there are some kinds of working implements that cannot be inclined to appropriately locate their engagement devices. If the working vehicle needs such a kind of working implement to be connected to its vehicle body via the quick hitch, it may be difficult to connect the working implement to the quick hitch.

SUMMARY OF THE INVENTION

An object of the invention is to provide a working vehicle that can easily have a working implement connected to its quick hitch even if the working implement is unable to incline to appropriately locate its engagement device.

To achieve the object, a working vehicle according to the invention comprises a vehicle body, a quick hitch, a working implement connected to the vehicle body via the quick hitch, and a linkage interposed between the quick hitch and the vehicle body. The linkage is movable to raise and lower the quick hitch so as to locate the quick hitch at an optional height. The quick hitch is able to incline to a certain degree in a pitching direction of the vehicle body at the optional height defined by the linkage.

Therefore, the quick hitch can incline to facilitate its connection to the working implement wherever the optional height of the quick hitch may be set to correspond to a connection portion of the working implement to be connected to the quick hitch. Conversely, the working implement does not have to be inclined for its connection to the quick hitch. Therefore, many kinds of working implements benefit from the quick hitch that enables easy connecting the working implement to the vehicle body of the working vehicle.

Preferably, the linkage includes a top link and a pair of lower links. The lower links are connected to respective lower portions of the quick hitch. The quick hitch is rotatable to incline in the pitching direction of the vehicle body centered on the lower portions of the quick hitch connected to the lower links. The top link is connected to the quick hitch via a pin passed through a slot provided in the quick hitch. The quick hitch is provided with a locking system for locking the quick hitch at a certain position relative to the pin.

Therefore, due to the pin passed through the slot to connect the top link to the quick hitch, the quick hitch ensures its ability of rotating to incline at the optional height. Further, due to the locking system, the quick hitch can be locked to be kept from unexpectedly inclining.

Preferably, the quick hitch is provided with a coupling connected to a connection shaft extended from a power take off (PTO) shaft provided on the vehicle body.

Therefore, due to the coupling, the PTO shaft can be drivingly connected to the working implement when the quick hitch is connected to the working implement.

Further preferably, the quick hitch includes an upper engagement section and a pair of lower engagement sections. The working vehicle further comprises a connection assist frame mounted on the working implement so as to assist connection of the quick hitch to the working implement. The connection assist frame includes an upper support shaft, a pair of lower support shafts, and a PTO stub axle. The upper support shaft is adapted to engage with the upper engagement section of the quick hitch, the pair of lower support shafts are adapted to engage with the pair of lower engagement sections of the quick hitch, and the PTO stub axle is adapted to connect the coupling of the quick hitch to a drive shaft of the working implement. The quick hitch and the connection assist frame are configured so that the coupling is automatically connected to the PTO stub axle when connection of the quick hitch to the connection assist frame mounted on the working implement is completed by engaging the upper support shaft and the pair of lower support shafts with the upper engagement section and the pair of lower engagement sections, respectively.

Therefore, due to the connection assist frame mounted on the working implement, the working implement can easily be connected to the quick hitch even if the working implement includes only a connection device insufficient in facility for its connection to the quick hitch. Further, due to the automatic connection of the coupling of the quick hitch to the PTO stub axle of the connection assist frame, an operator does not have to be nervous about connection of the connection shaft extended from the PTO shaft to the drive shaft of the working implement if only the operator takes care of operating the linkage to connect the quick hitch to the connection assist frame on the working implement.

As mentioned above, the working vehicle of the present invention is advantageous in facility for connecting the quick hitch to the working implement.

These and other objects, features and advantages of the invention will appear more fully from the following detailed description of the invention with reference to the attached drawings.

DETAILED DESCRIPTION OF THE INVENTION

Figure 1:
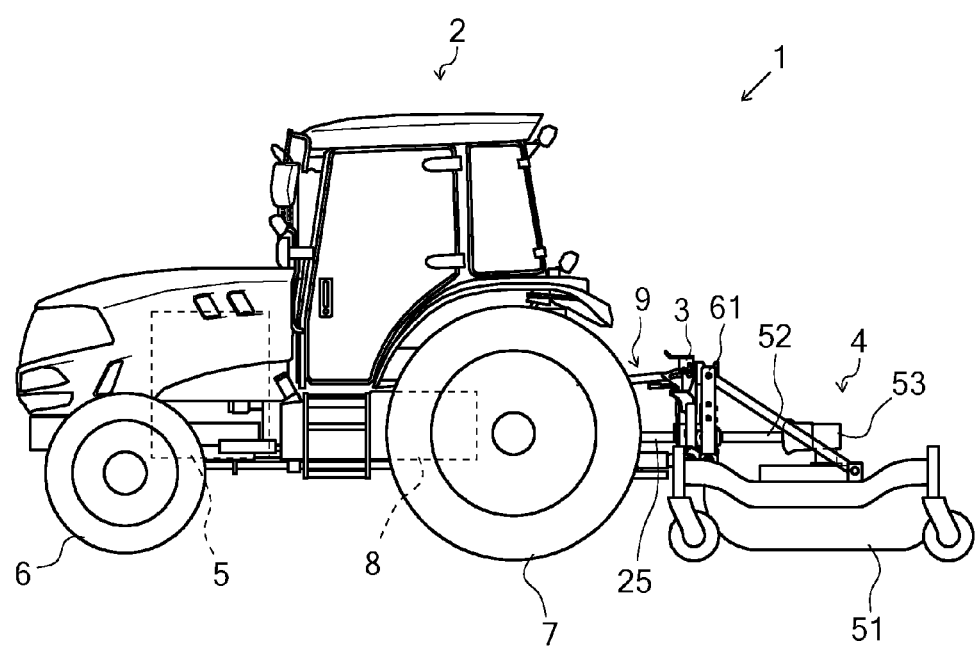
FIG. 1 is a side view of a working vehicle.

An entire configuration of a working vehicle 1 according to an embodiment of the invention will be described with reference to FIG. 1 and other drawings. In this embodiment, a tractor serves as working vehicle 1, however, working vehicle 1 is not limited to the tractor.

Working vehicle 1 includes a vehicle body 2, and a working implement 4 connected to a rear portion of vehicle body 2 via a quick hitch 3. Vehicle body 2 is provided with an engine 5, front wheels 6 and rear wheels 7, so that working vehicle 1 travels with front wheels 6 and rear wheels 7 driven by power from engine 5, and working implement 4 works during the travel of working vehicle 1. Vehicle body 2 is provided at a rear portion thereof with a transmission casing 8 for transmitting the power from engine 5 to front wheels 6 and rear wheels 7. Further, transmission casing 8 defining the rear portion of vehicle body 2 is provided at a rear portion thereof with a PTO shaft (not shown), which transmits the power from engine 5 in vehicle body 2 to working implement 4 connected to vehicle body 2.

Figure 2A:
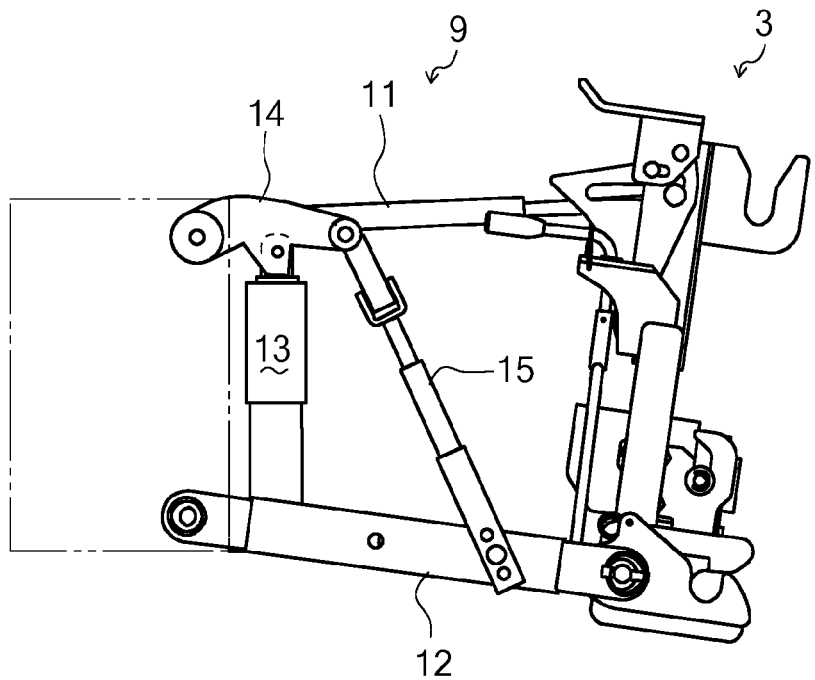
FIG. 2A is a side view of a quick hitch lowered with a linkage.
Figure 2B:
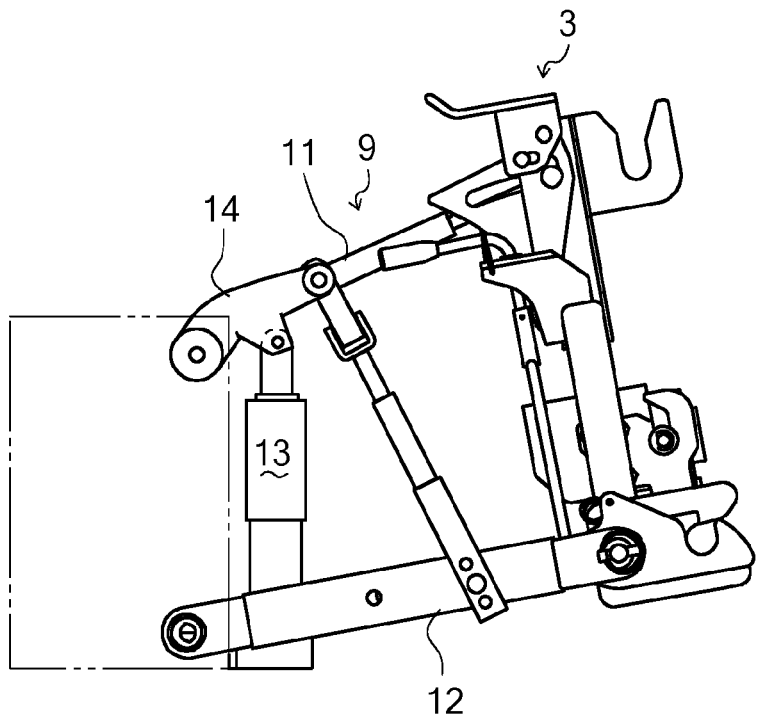
FIG. 2B is a side view of the quick hitch raised with the linkage.

Working vehicle 1 is provided at a rear portion of vehicle body 2 with a linkage 9, which lowers quick hitch 3 as shown in FIG. 2A and raises quick hitch 3 as shown in FIG. 2B. Linkage 9 includes a top link 11, right and left lower links 12, right and left hydraulic cylinders serving as lift cylinders 13, right and left lift arms 14, and right and left lift links 15.

Top link 11 is connected at a basal (front) end thereof to the rear portion of vehicle body 2, and is connected at an utmost (rear) end thereof to an upper portion of quick hitch 3. Each of right and left lower links 12 is connected at a basal (front) end thereof to the rear portion of vehicle body 2, and is connected at an utmost (rear) end thereof to each of right and left lower end portions of quick hitch 3.

Right and left lift arms 14 are pivoted at front ends thereof to the rear portion of vehicle body 2 so as to be vertically rotatable integrally with each other so as to have a constant gap therebetween. Each lift cylinder 13 is pivotally connected at an end thereof to the rear portion of vehicle body 2, and at another end thereof to an intermediate portion of corresponding lift arm 14. Each lift link 15 is pivotally connected at an end thereof to an intermediate portion of corresponding lift arm 14, and at another end thereof to an intermediate portion of corresponding lower link 12.

By telescopically activating lift cylinders 13, right and left lift arms 14 are vertically rotated to raise or lower right and left lower links 12 via lift links 15, whereby top link 11 also rotates upward or downward following raised or lowered right and left lower links 12, thereby raising or lowering quick hitch 3 attached to the rear ends of top link 11 and right and left lower links 12.

Quick hitch 3 will be described with reference to FIGS. 1 to 4. Quick hitch 3 is a device for connecting vehicle body 2 to working implement 4. Quick hitch 3 includes a frame 21, a bracket 22, an upper engagement section 23, right and left lower engagement sections 24, and a coupling 26. Frame 21 is formed in a reversed U-shape in a front view so as to include a laterally extended upper bar portion 21a, and right and left side bar portions 21b extended downward from right and left ends of upper bar portion 21a. Bracket 22 is fixed on a lateral center of upper bar portion 21a of frame 21 so as to be defined as an upper portion of quick hitch 3, and is connected to the rear end of top link 11 in a laterally-discussed way. Upper engagement section 23 is provided on a rear end portion of bracket 22 so as to be adapted to hook and hitch up a later-discussed upper support shaft 62 of a connection assist frame 61 mounted on working implement 4. Right and left lower engagement sections 24 are provided on right and left distal sides of lower end portions of right and left side bar portions 21b of frame 21 so as to be adapted to engage with later-discussed right and left lower support shafts 63 of connection assist frame 61. Coupling 26 is coupled to a connection shaft 25 extended rearward from the PTO shaft provided on the rear portion of vehicle body 2.

Figure 5A:
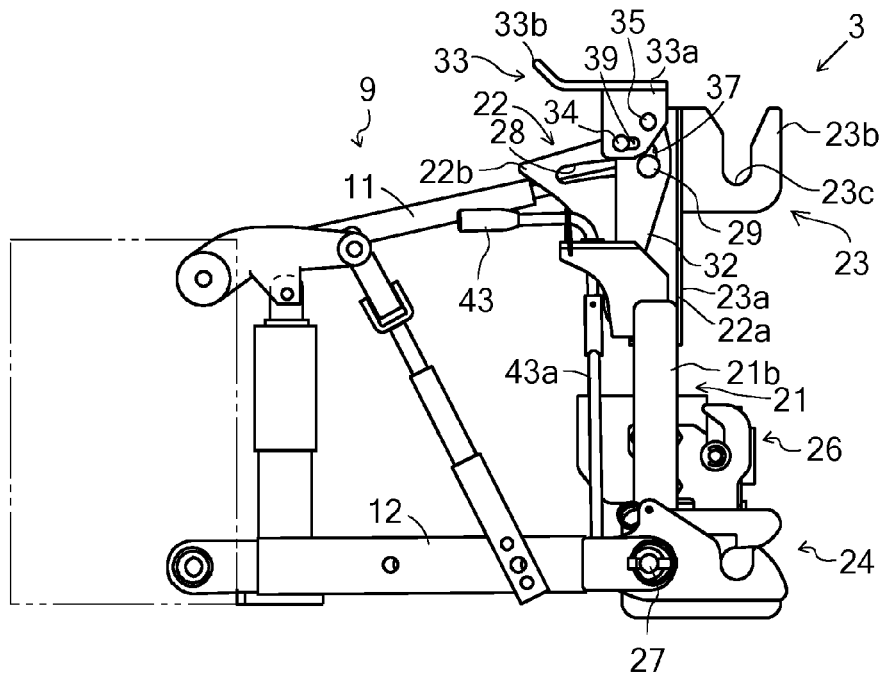
FIG. 5A is a side view of the quick hitch at a locked position so as to be kept from inclining.
Figure 5B:
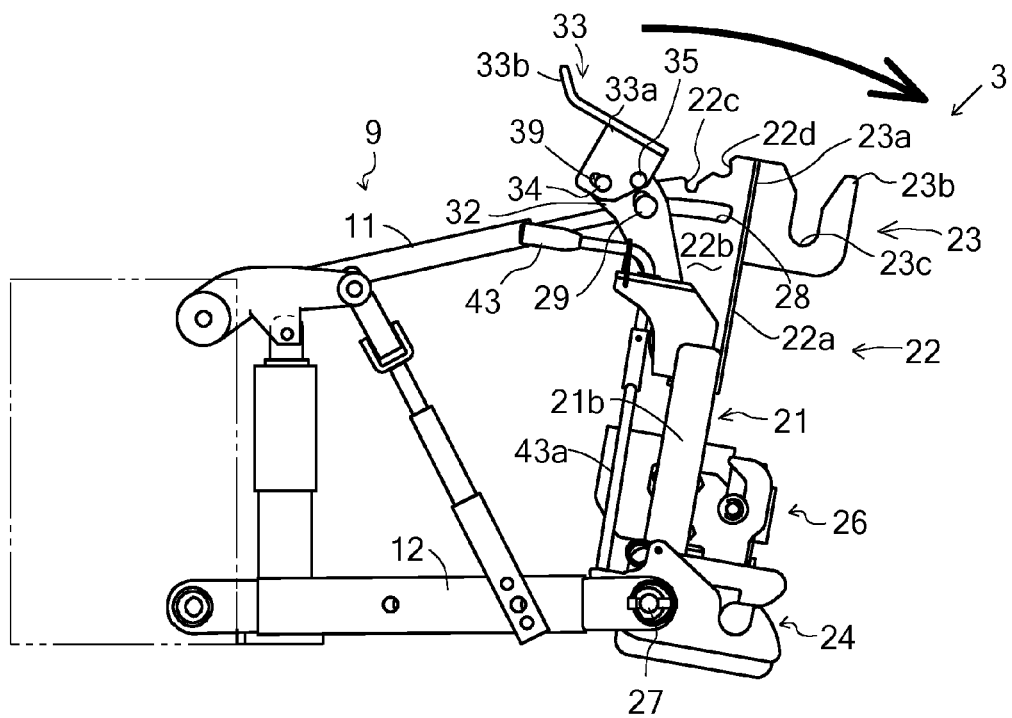
FIG. 5B is a side view of the quick hitch unlocked to incline.

Referring to FIGS. 5A and 5B, quick hitch 3 is rotatable to incline to a certain degree at any optionally selected height. In this regard, right and left lower links 12 are pivotally connected at rear end portions thereof to right and left lower portions of quick hitch 3, i.e., right and left distal sides of the lower end portions of right and left bar portions 21b of frame 21, via respective pivot pins 27, so that quick hitch 3 is rotatable centered on pivot pins 27 so as to change an angle relative to right and left lower links 12.

Figure 6:
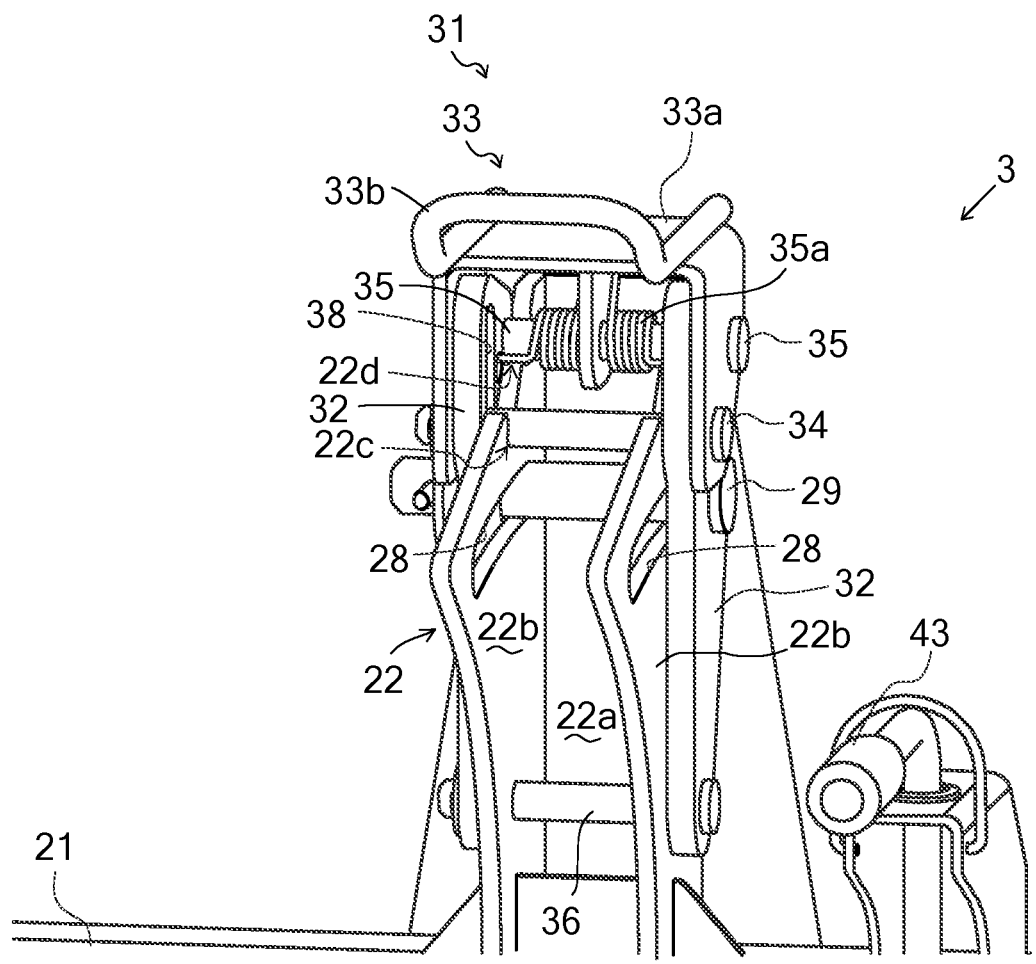
FIG. 6 is an enlarged fragmentary perspective view of an upper portion of the quick hitch.

On the other hand, as best understood from FIG. 6, bracket 22 defined as the upper portion of quick hitch 3 is a plate bent in a forwardly open U-shape so as to include a laterally extended rear side portion 22a, and right and left side portions 22b extended forward in a pitching (i.e., fore-and-aft) direction of vehicle body 2 from right and left ends of rear side portion 22a.

Referring to FIGS. 3, 4, 5A and 5B, upper engagement section 23 includes a fixture plate member 23a and a hook member 23b projecting from fixture plate member 23b. Fixture plate member 23a is stuck to a rear end surface of rear side portion 22a of bracket 22 so that hook member 23b projects rearward from fixture plate member 23a on rear side portion 22a of bracket 22. As later discussed, upper support shaft 62 of connection assist frame 61 mounted on working implement 4 can be fitted into a hook groove 23c formed in hook member 23b of upper engagement section 23 of quick hitch 3.

Referring to FIG. 6, right and left side portions 22b of bracket 22 are formed with respective slots 28. The rear end portion of top link 11 is disposed between right and left side portions 22b of bracket 22, and a laterally extended pin 29 is passed through the rear end portion of top link 11 and right and left slots 28, thereby connecting the rear end portion of top link 11 to the upper portion of quick hitch 3. Quick hitch 3 is rotatable in the pitching direction centered on its right and left lower pivotal connection portions connected to right and left lower links 12, i.e., centered on pivot pins 27, so as to change a position of its upper portion, i.e., bracket 22, relative to top link 11.

Each slot 28 has an arcuate shape in a side view like a part of circle centered on pivot pin 27 at the lower portion of quick hitch 3. Slot 28 has a length in the fore-and-aft (pitching) direction between its opposite front and rear ends so as to define a slidable range of pin 29 in slot 28. Therefore, quick hitch 3 is rotatable centered on pivot pins 27 at the right and left lower portions thereof pivotally connected to right and left lower links 12 in each of opposite forward and rearward directions until one of the front and rear ends of each slot 28 moving in the rotation direction of quick hitch 3 comes to abut against pin 29. In other words, the length of slot 28 between its front and rear ends defines the above-mentioned certain degree of inclination of quick hitch 3 according to the rotation of quick hitch 3 centered on pivot pins 27.

Referring to FIGS. 3 to 6, bracket 22 of quick hitch 3 is provided with a locking system 31 for locking quick hitch 3 with pin 29 at a certain (locked) position. Locking system 31 includes a pair of locking members 32 and an unlocking handle 33. Locking members 32 are provided to lock bracket 22 with pin 29 at the locked position. Unlocking handle 33 serves as a manipulator for unlocking bracket 22 from pin 29.

Right and left locking members 32 are disposed so as to cover right and left distal side surfaces of bracket 22. Locking members 32 are pivoted at lower portions thereof to bracket 22 via a laterally extended pivot pin 36 so that locking members 32 are rotatable centered on pivot pin 36. Locking members 32 are formed in vertically intermediate portions thereof with respective slots 37. Slots 37 of right and left locking members 32 are located to cross respective right and left slots 28 of bracket 22 so that pin 29 passed through right and left slots 28 of bracket 22 is also passed through slots 37 of right and left locking members 32. Lengths and directions of slots 37 are set so as to allow pin 29 to slide between the front and rear ends of slots 28 when quick hitch 3 including bracket 22 and frame 21 rotates centered on pivot pins 27 in the pitching direction relative to top link 11.

Referring to FIGS. 5A, 5B and 6, front and rear lock pins 34 and 35 are extended in the lateral direction of vehicle body 2, and are passed through upper portions of right and left locking members 32. Upper edges of right and left side portions 22b of bracket 22 are slanted forwardly downward, and the upper edge of each of right and left side portions 22b of bracket 22 is formed on a rear portion thereof with an upwardly open front recess 22c and a forwardly open rear recess 22d. Front lock pin 34 is adapted to be fitted downward into right and left front recesses 22c of bracket 22, and rear lock pin 35 is adapted to be fitted rearward into right and left rear recesses 22d of bracket 22. Therefore, locking members 32 are adapted to lock bracket 22 by fitting front and rear lock pins 34 and 35 into respective front and rear recesses 22c and 22d of bracket 22.

Quick hitch 3 is shiftable between a locked position as shown in FIG. 5A and an unlocked position as shown in FIG. 5B. The locked position of quick hitch 3 is defined as a foremost position of quick hitch 3 in its rotation range centered on pivot pins 27, where pin 29 is located at the rear ends of right and left slots 28 of bracket 22. Lock pins 34 and 35 can be fitted into respective front and rear recesses 22c and 22d only when quick hitch 3 is located at the locked position. At the locked position, quick hitch 3 appears to stand upright, i.e., right and left side bar portions 21b of frame 21 and rear side portion 22a of bracket 22 are extended vertically upward from lower links 12 in a side view as show in FIG. 5A.

Quick hitch 3 has a rearwardly (toward working implement 4) eccentric center of balance so that, once quick hitch 3 at the locked position is unlocked from pin 29 by releasing lock pins 34 and 35 from recesses 22c and 22d of bracket 22, quick hitch 3 naturally rotates rearward centered on pivot pins 27 until pin 29 reaches the front ends of slots 28. The position of quick hitch 3 having pin 29 located at the front ends of slots 28 is defined as the unlocked position of quick hitch 3 as shown in FIG. 5B, where quick hitch 3 is inclined rearward so that right and left side bar portions 21b of frame 21 and rear side portion 22a of bracket 22 are extended rearwardly upward slantwise from pivot pins 27 when viewed in side. Therefore, when quick hitch 3 is located at the unlocked position, a rear upper edge of a later-discussed hook member 23a of upper engagement section 23 is oriented rearwardly upward slantwise so that upper support shaft 62 of connection assist frame 61 can be easily fitted into a later-discussed hook groove 23c of upper engagement section 23.

Referring to FIGS. 5A, 5B and 6, locking members 31a are provided with unlocking handle 33 for unlocking bracket 22 from pin 29. Unlocking handle 33 includes a bracket 33a bent in a reversed U-shape open downward in a front view, and includes a grip bar 33b fixed on a top portion of bracket 33a and extended forward from bracket 33a.

Bracket 33a of unlocking handle 33 is placed to cover top edges of right and left locking members 32 and upper portions of right and left distal side surfaces of right and left locking members 32. A front lock pin 34 is passed through slots 38 formed in right and left locking members 32, and is passed through right and left slots 39 formed in right and left side portions of bracket 33a of unlocking handle 33, so that front lock pin 34 is allowed to move together with unlocking handle 33 relative to right and left locking members 32.

Rear locking pin 35 is passed through rear upper portions of right and left locking members 32 and is fixed at right and left ends thereof to rear portions of the right and left side potions of bracket 33a of unlocking handle 33, so that unlocking handle 33 is pivoted onto right and left locking members 32 via rear locking pin 35. At least one spring 35a is wound around rear locking pin 35 so as to connect unlocking handle 33 to right and left locking members 32, thereby biasing a front portion of unlocking handle 33 downward toward locking members 32. Due to a force of spring 35a, lock pins 34 and 35 fitted in recesses 22c and 22d are kept from being unexpectedly released from recesses 22c and 22d unless unlocking handle 33 is raised as discussed later.

When grip bar 33b of unlocking handle 33 is gripped by an operator and is raised so as to rotate the front portion of unlocking handle 33 upward centered on rear lock pin 35 against spring 35a, front lock pin 34 is raised together with unlocking handle 33 so as to move upward along slots 38 of locking members 32 away from front recesses 22c of bracket 22, thereby unlocking bracket 22 from front lock pin 34 passed through locking members 32. Then, due to the above-mentioned rearwardly eccentric center of balance, bracket 22 starts to rotate rearward so that rear recesses 22d of bracket 22 move rearward away from rear lock pin 35, thereby unlocking bracket 22 from rear lock pin 35. Therefore, quick hitch 3 naturally rotates rearward (clockwise when viewed in left side as shown in FIG. 5B) centered on pivot pins 27 so that pin 29 moves forward along slots 28 relative to rearward rotating bracket 22, until pin 29 reaches the front ends of slots 29, i.e., until quick hitch 3 reaches the unlocked position.

In this way, the only thing required to incline quick hitch 3 rearward for easily hooking upper support shaft 62 of connection assist frame 61 onto upper engagement section 23 of quick hitch 3 is to raise unlocking handle 33 to unlock bracket 22 from front lock pin 34, so that quick hitch 3 can be easily set at the unlocked position as an appropriate position for hooking and hitching up upper support shaft 62 of connection assist frame 61 of working implement 4.

Incidentally, after quick hitch 3 reaches the unlocked position, once the operator releases grip bar 33b of raised unlocking handle 33 from his/her hand, unlocking handle 33 naturally rotates downward to put front and rear lock pins 34 and 35 on front portions of the upper edges of right and left side portions 22b of bracket 22 forward from front recesses 22c. In this state, spring 35a presses front and rear lock pins 34 and 35 against the upper edges of right and left side portions 22b of bracket 22, however, the force of spring 35a is so small as to allow lock pins 34 and 35 to slide relative to bracket 22, thereby allowing bracket 22 to rotate forward relative to pin 29 from the unlocked position of quick hitch 3 to the locked position of quick hitch 3.

Figure 3:
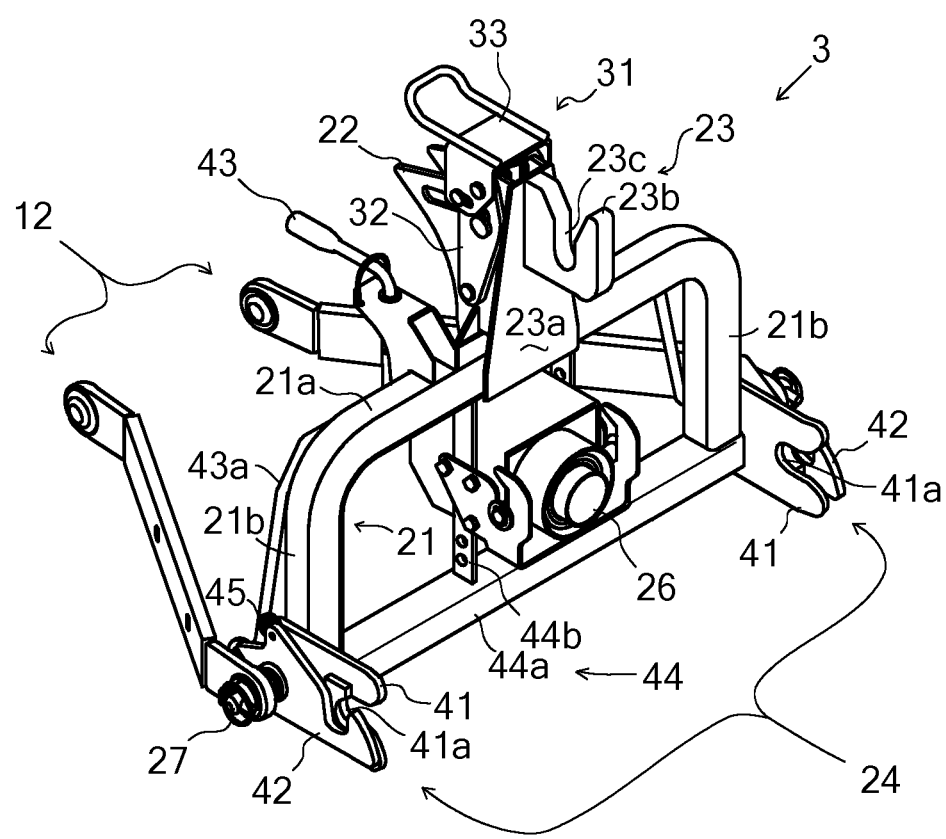
FIG. 3 is a perspective rear view of the quick hitch.
Figure 4:
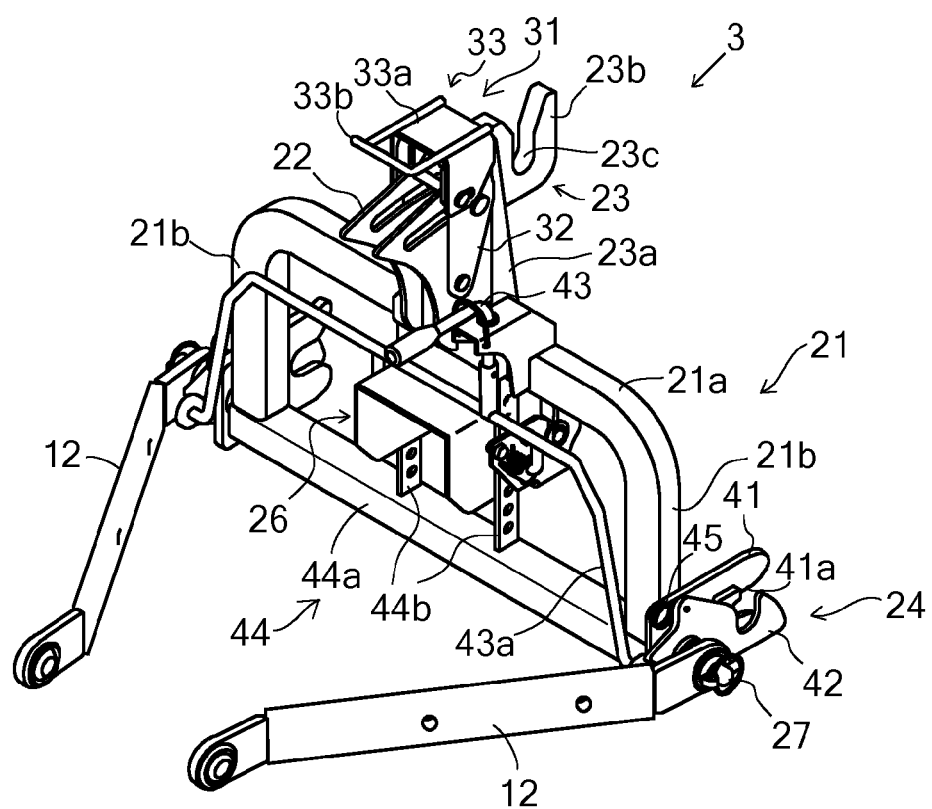
FIG. 4 is a perspective front view of the quick hitch.
Figure 7:
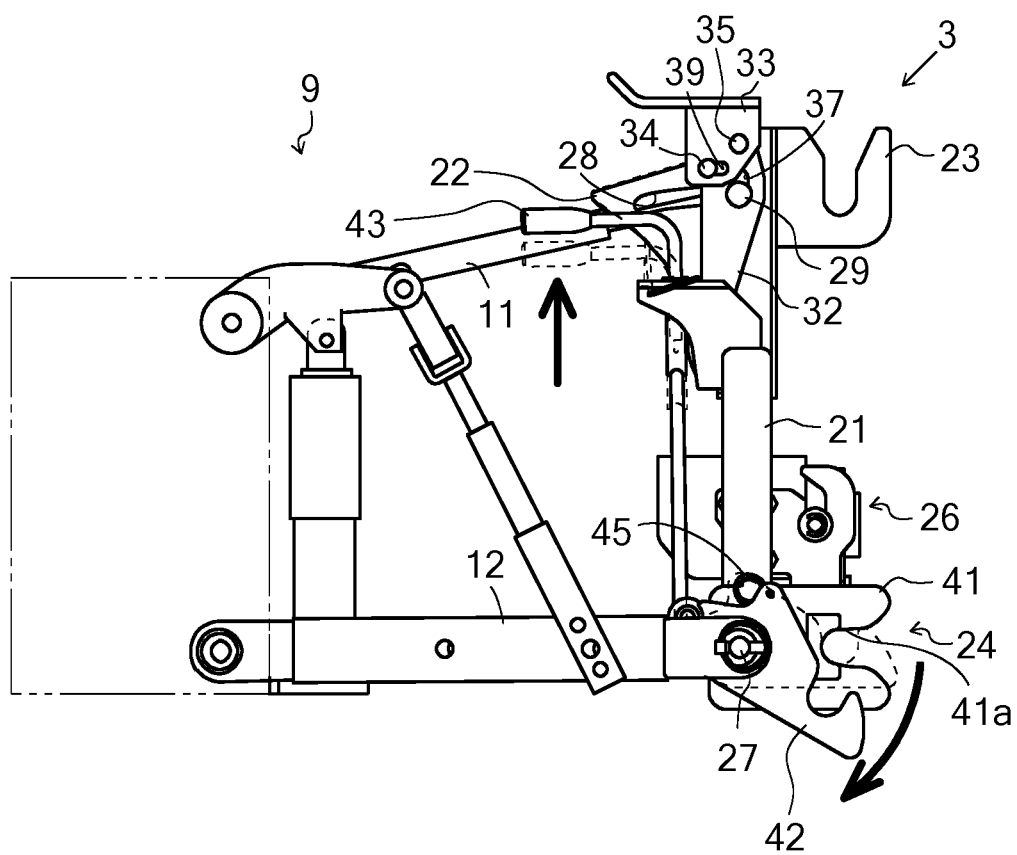
FIG. 7 is a side view of the quick hitch when locking pawl members of lower engagement sections are rotated to open grooves in the lower engagement sections.

Referring to FIGS. 3, 4 and 7, right and left lower engagement sections 24 will be described in detail. Each of right and left lower engagement sections 24 includes a grooved frame 41 having a rearwardly open groove 41a into which each lower support shaft 63 of working implement 4 can be inserted. Each lower engagement section 24 also includes a locking pawl member 42 for locking lower support shaft 63 in groove 41a of grooved frame 41.

Right and left grooved frames 41 are fixed to distal side surfaces of the lower portions of right and left side bar portions 21b of frame 21 so as to be integrated with frame 21 of quick hitch 3. Right and left pivot pins 27 project distally in the lateral direction from right and left grooved frames 41 and are passed through the rear end portions of respective right and left lower links 12. Each locking pawl member 42 is vertically rotatably pivoted on pivot pin 27 between grooved frame 41 and the rear end portion of lower link 12. Each locking pawl member 42 is formed with an upwardly projecting pawl at a rear end portion thereof, and is formed with an upwardly open recess extended forward from the pawl so as to correspond to a front end portion of groove 41a.

A locking lever 43 is provided on upper bar portion 21a of frame 21 adjacent to bracket 22, and is operatively connected via a bifurcated link rod 43a to front end portions of right and left locking pawl members 42. Referring to FIG. 7, locking lever 43 is rotatably shifted between a locking position as drawn in phantom lines and an unlocking position as drawn in solid lines. Right and left locking pawl members 42 are connected to respective grooved frames 41 via respective springs 42a so as to be biased toward their locking position as drawn in phantom lines in FIG. 7.

When locking lever 43 is set at the locking position, right and left locking pawl members 42 are located at their locking position as drawn in phantom lines in FIG. 7 so as to have their rear end pawls close the rear end openings of grooves 41a of grooved frames 41, thereby locking right and left lower support shafts 63 in respective grooves 41a of right and left grooved frames 41. When locking lever 43 is rotated to the unlocking position against springs 42a, the front end portions of locking pawl members 42 are pulled upward so that the rear end pawls of locking pawl members 42 are rotated downward as drawn in solid lines in FIG. 7 so as to open the rear end openings of the grooves of grooved frames 41, thereby allowing right and left lower support shafts 63 to be inserted or released to and from the grooves of right and left grooved frames 41.

Figure 8:
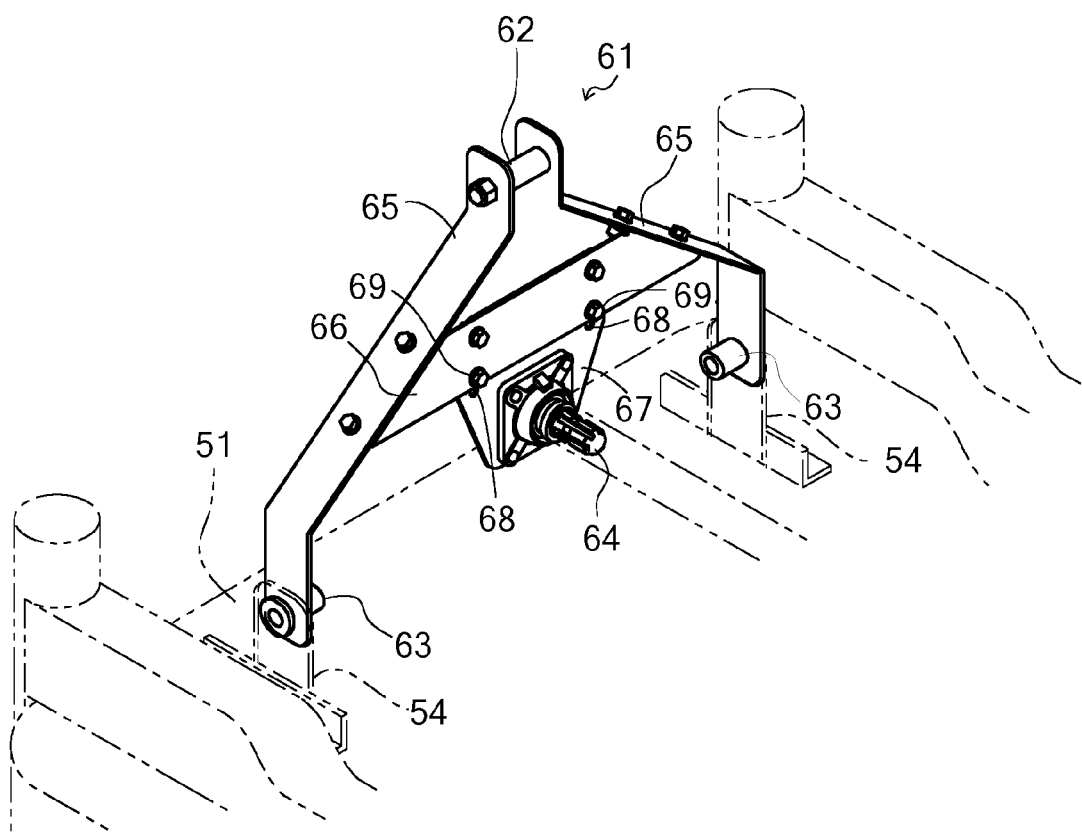
FIG. 8 is a perspective rear view of a connection assist frame mounted on a working implement.
Figure 9:
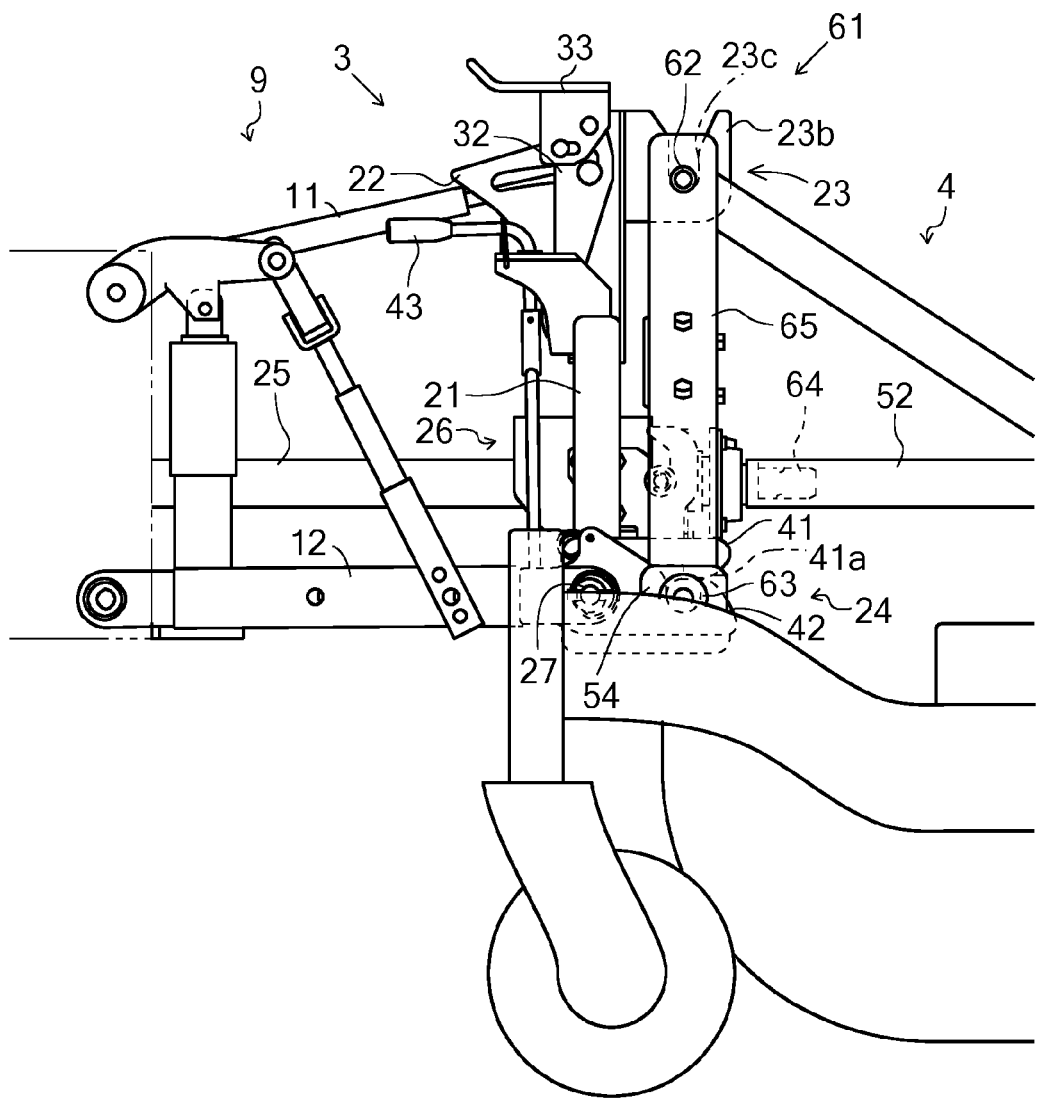
FIG. 9 is a side view of the connection assist frame engaged with the quick hitch.

As shown in FIG. 1, connection shaft 25 is extended rearward from the PTO shaft projecting rearward from the rear portion of vehicle body 2. On the other hand, as shown in FIGS. 8 and 9, connection assist frame 61 of working implement 4 supports a PTO stub axle 64. PTO stub axle 64 is connected to connection shaft 25 via coupling 26 of quick hitch 3 so as to be drivingly connected to the PTO shaft of working vehicle 1.

Referring to FIGS. 3 and 4, coupling 26 will be described. Quick hitch 3 includes a bracket 44 for supporting coupling 26. Bracket 44 includes a base frame 44a and right and left support frames 44b. Base frame 44a is extended laterally between right and left grooved frames 41 so as to connect the lower ends of right and left side bar portions 21b of frame 21 to each other. Right and left support frames 44b are extended parallel to each other and vertically between base frame 44a and upper bar portion 21a of reversed U-shaped frame 21.

Coupling 26 is disposed between right and left support frames 44b of bracket 44, and is fastened at right and left ends thereof to right and left support frames 44b via fasteners, e.g., pins or bolts. Each of right and left support frames 44b is provided with a plurality of holes aligned vertically, so that the fastener is inserted into at least one selected from the holes. Therefore, a vertical position of coupling 26 relative to bracket 44 is adjustable so that coupling 26 can be located at an appropriate height in consideration of a height of PTO stub axle 64 of working implement 4, thereby enabling a later-discussed automatic connection of coupling 26 to PTO stub axle 64.

Any kind of working implement may serve as working implement 4 to be connected to vehicle body 2 of working vehicle 1 via quick hitch 3. Referring to FIG. 1, in the present embodiment, a rear mower serves as working implement 4. The rear mower serving as working implement 4 includes at least one rotary blade for mowing grass and a mower deck 51 accommodating the at least one rotary blade. Therefore, working implement 4 includes a drive shaft 52 for receiving power from vehicle body 2 of working vehicle 1, and a gearbox 53 for transmitting power from drive shaft 52 to the rotary blade, so that gearbox 53 is mounted upon mower deck 51, and drive shaft 52 is extended fore-and-aft direction above mower deck 51, and is inserted at a rear end thereof into gearbox 53.

Working vehicle 1 is provided with connection assist frame 61 for connection of working implement 4 to quick hitch 3. Connection assist frame 61 is fixedly attached on an appropriate portion of working implement 4. The appropriate portion of working implement 4 means a portion that is appropriate to connection of an input side end (in this embodiment, a front end) of drive shaft 52 of working implement 4 to PTO stub axle 64 of connection assist frame

61. In this embodiment, as shown in FIG. 8, right and left stays 54 are fixed on a front upper portion of mower deck 51, and right and left frame members 65 of connection assist frame 61 are attached at lower end portions thereof to right and left stays 54, thereby fixing connection assist frame 61 to working implement 4.

Referring to FIGS. 8 and 9, connection assist frame 61 includes upper support shaft 62, right and left lower support shafts 63, PTO stub shaft 64, right and left frame members 65, a cross frame member 66, and an axle support member 67. Upper support shaft 62 is engaged with upper engagement section 23 of quick hitch 3, and right and left lower support shafts 63 are engaged with lower engagement sections 24 of quick hitch 3.

Each of right and left frame members 65 is an elongated metal plate that is bent at two positions so as to form an upper vertical portion, a lower vertical portion, and a slant portion extended between the upper and lower vertical portions. Right and left frame members 65 are arranged to have a narrow gap between their upper vertical portions, and a wide gap between their lower vertical portions. Upper support shaft 62 is extended laterally between the upper vertical portions of right and left frame members 65. Right and left lower support shafts 63 project toward each other laterally proximally from the lower vertical portions of right and left frame members 65.

Cross frame member 66 is a laterally extended vertical plate, which is fixed at right and left ends thereof to the slant portions of right and left frame members 65. Axle support member 67 supporting PTO stub axle 64 is connected to cross frame member 66 so as to extend downward from a laterally central portion of cross frame member 66. Axle support member 67 is provided in an upper portion thereof with vertically long slots 67a. The upper portion of axle support member 67 is fastened to cross frame member 66 by bolts passed through respective slots 67a. By changing positions of the bolts relative to respective slots 67a, axle support member 67 with PTO stub shaft 64 can be adjusted in vertical location relative to cross frame member 66.

As mentioned above, connection assist frame 61 is attached to the appropriate portion of working implement 4, and a vertical position of PTO stub axle 64 in connection assist frame 61 is adjustable, so that PTO stub axle 64 is located at an appropriate position such that quick hitch 3 can be easily connected to connect assist frame 61 so as to automatically connect coupling 26 to PTO stub axle 64.

Figure 10A:
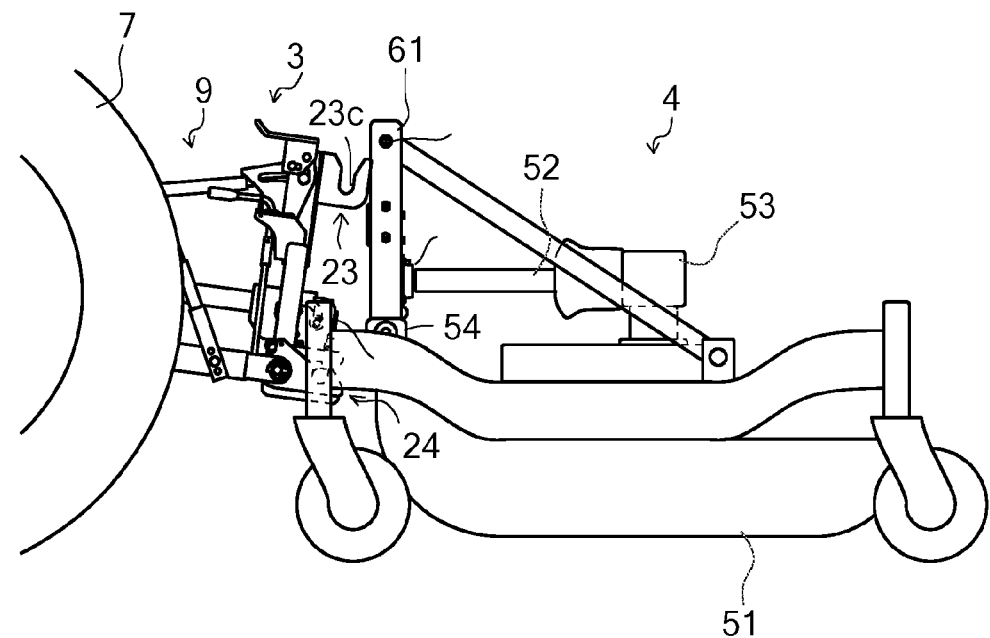
FIG. 10A is a side view of the quick hitch just before hitching up an upper support shaft of the connection assist frame of the working implement.
Figure 10B:
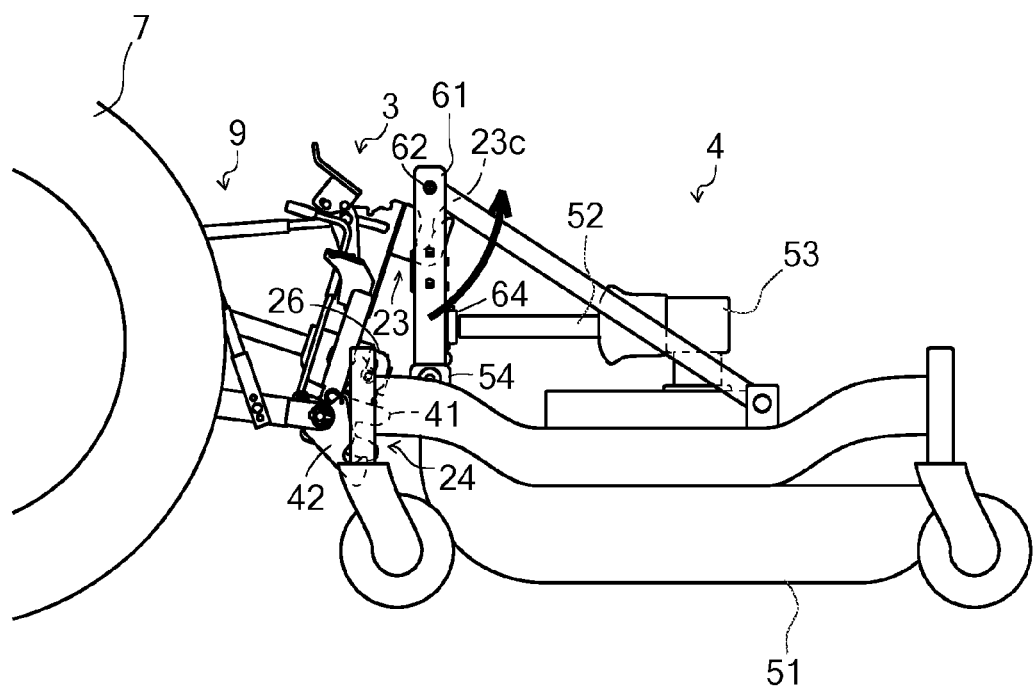
FIG. 10B is a side view of the quick hitch hitching up the upper support shaft.

Referring to FIGS. 10A and 10B, a process of attaching working implement 4 to vehicle body 2 will be described.

First, connection assist frame 61 is settled on working implement 4 (via hinges 51a), and drive shaft 52 of working implement 4 is connected to PTO stub shaft 64 of connection assist frame 61.

Then, vehicle body 2 is moved to locate quick hitch 3 at an appropriate position relative to connection assist frame 61 on working implement 4 as shown in FIG. 10A, so that upper support shaft 62 of connection assist frame 61 can easily be hooked on and hitched up by upper engagement section 23 of quick hitch 3.

After the location of vehicle body 2 with quick hitch 3 is settled, lock lever 43 is manipulated to rotate the rear end pawls of right and left locking pawl members 42 downward so as to open the rear end openings of grooves 41a of right and left grooved frames 41 facing working implement 4, as shown in FIG. 10B. Further, unlocking handle 33 is manipulated to rotate upward at the front end thereof so as to unlock bracket 22 from pin 29, whereby quick hitch 3 naturally rotates to incline rearward so as to locate hook groove 23c formed in hook member 23b of upper engagement section 23 just below upper support shaft 62 of connection assist frame 61 on working implement 4, as shown in FIG. 10B.

Then, lift cylinders 13 are telescopically extended to raise linkage 9 and quick hitch 3 in an arrowed direction in FIG. 10B, so that upper support shaft 62 of connection assist frame 61 is fitted into hook groove 23c so as to be hitched by upper engagement section 23 of quick hitch 3.

Lift cylinders 13 are further telescopically extended to raise quick hitch 3 and connection assist frame 61 having upper support shaft 62 hooked on upper engaging member 23 of quick hitch 3, so that right and left lower engagement sections 24 of quick hitch 3 and right and left lower support shafts 63 of connection assist frame 61 approach each other, and meanwhile, coupling 26 of quick hitch 3 and PTO stub axle 64 of connection assist frame 61 approach each other. Finally, right and left lower support shafts 63 naturally enter respective grooves 41a of right and left grooved frames 41, and PTO stub axle 64 is naturally coupled to coupling 26.

During the raising of quick hitch 3 together with connection assist frame 61 having upper support shaft 62 hooked on upper engagement portion 23, quick hitch 3 rotates forward centered on right and left lower engagement sections 24, so that pin 29 passed through slots 28 of bracket 22 moves rearward relative to bracket 22, and front and rear lock pins 34 and 35 slide on the upper edges of right and left side portions 22b of bracket 22 rearward relative to bracket 22. Finally, pin 29 reaches the rear ends of slots 28, and at this time, both front and rear lock pins 34 and 35 are fitted in front recesses 22c and rear recesses 22d, whereby locking members 32 are locked to bracket 22, thereby locking quick hitch 3, i.e., keeping quick hitch 3 from naturally rotating to incline rearward due to its rearwardly eccentric center of balance.

Then, locking lever 43 is manipulated to its locking position to rotate right and left locking pawl members 42 upward so as to lock lower support shafts 63 in grooves 41a of grooved frames 41, thereby completing connection of working implement 4 to quick hitch 3 provided on vehicle body 2 of working vehicle 1.

Conversely, a process of removing working implement 4 from vehicle bod 2 will be described.

First, lock lever 43 is manipulated to rotate the rear end pawls of right and left locking pawl members 42 downward so as to open the rear end openings of grooves 41a of right and left grooved frames 41. Further, unlocking handle 33 is manipulated to unlock bracket 22 from pin 29, so that quick hitch 3 is inclined rearward.

Then, lift cylinders 13 are telescopically contracted to lower linkage 9 and quick hitch 3, so that hook groove 23c of hook member 23b of upper engagement section 23 moves downward away from upper support shaft 62. Meanwhile, vehicle body 2 is slightly moved forward so that upper engagement section 23 moves forward away from upper support shaft 62, and right and left lower support shafts 63 are released from grooves 41a of grooved frames 41 of right and left lower engagement sections 24, whereby quick hitch 3 is separated from connection assist frame 61 on working implement 4, thereby removing working implement 4 from vehicle body 2.

Advantages of working vehicle 1 will be described. Due to the changeable inclination of quick hitch 3, work implement 4 does not have to be inclined for its connection to quick hitch 3. This advantage is conspicuous especially if working implement 4 belongs to a group of working implements that are hard to incline because drive shaft 52 of working implement 4 to be connected to coupling 26 of quick hitch 3 via PTO stub axle 64 is too long or/and because of other reasons.

Due to the use of connection assist frame 61 that can easily be attached to working implement 4, working implement 4 can easily be connected to vehicle body 2 via quick hitch 3 even if working implement 4 does not have its own upper and lower support shafts corresponding to upper and lower support shafts 62 and 63 of connection assist frame 61. Therefore, many kinds of working implements benefit from quick hitch 3.

Due to the configuration of connection assist frame 61 supporting PTO stub axle 64 so that coupling 26 is naturally coupled to PTO stub axle 64 simultaneously with engagement of connection assist frame 61 to quick hitch 3, the PTO shaft of vehicle body 2 with connection shaft 25 is easily connected to drive shaft 52 of working implement 4.

It is further understood by those skilled in the art that the foregoing description is given to preferred embodiments of the disclosed apparatus and that various changes and modifications may be made in the invention without departing from the scope thereof defined by the following claims.

What is claimed is:

1. A working vehicle comprising:
a vehicle body;
a quick hitch;
a working implement connected to the vehicle body via the quick hitch; and
a linkage interposed between the vehicle body and the quick hitch,
wherein the linkage includes a top link and a pair of lower links,
wherein the lower links are connected to respective lower portions of the quick hitch,
wherein the quick hitch is rotatable to incline in the pitching direction of the vehicle body centered on the lower portion of the quick hitch connected to the lower links,
wherein the top link is connected to the quick hitch via a pin passed through a slot provided in the quick hitch,
wherein the quick hitch is provided with a locking system for locking the quick hitch at a certain position relative to the pin, and
wherein the linkage is movable to raise and lower the quick hitch so as to locate the quick hitch at an optional height,
whereby the quick hitch is able to incline to a certain degree in a pitching direction of the vehicle body at the optional height defined by the linkage.

2. The working vehicle according to claim 1,
wherein the quick hitch is provided with a coupling connected to a connection shaft extended from a power take off (PTO) shaft provided on the vehicle body.

3. The working vehicle according to claim 2,
wherein the quick hitch includes an upper engagement section and a pair of lower engagement sections,
wherein the working vehicle further comprises a connection assist frame mounted on the working implement so as to assist connection of the quick hitch to the working implement,
wherein the connection assist frame includes an upper support shaft, a pair of lower support shafts, and a PTO stub axle,
wherein the upper support shaft is adapted to engage with the upper engagement section of the quick hitch, the pair of lower support shafts are adapted to engage with the pair of lower engagement sections of the quick hitch, and the PTO stub axle is adapted to connect the coupling of the quick hitch to a drive shaft of the working implement, and
wherein the quick hitch and the connection assist frame are configured so that the coupling is automatically connected to the PTO stub axle when connection of the quick hitch to the connection assist frame mounted on the working implement is completed by engaging the upper support shaft and the pair of lower support shafts with the upper engagement section and the pair of lower engagement sections, respectively.

* * * * *